March 8, 1960  J. S. BENTLEY  2,927,473
ELECTRIC ACTUATORS

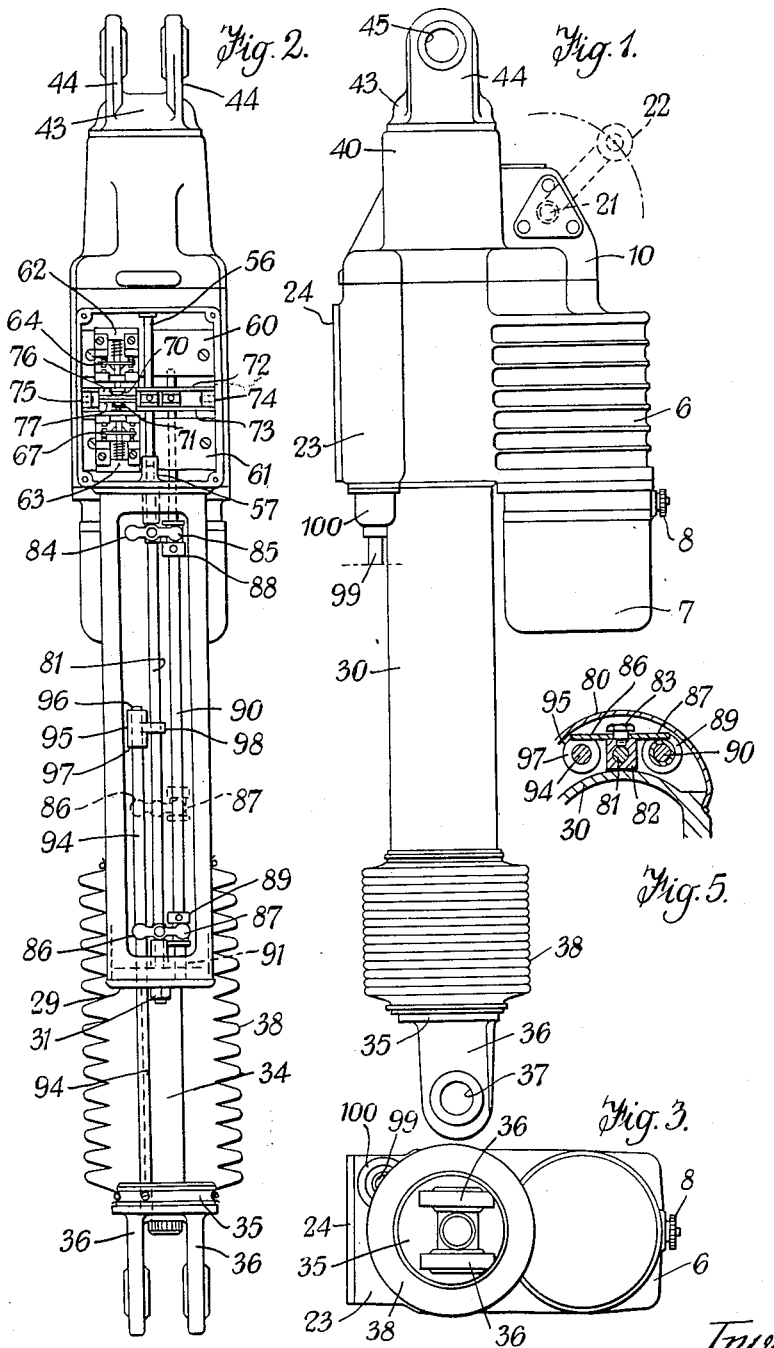

Filed July 24, 1958  3 Sheets-Sheet 2

Inventor
James Sydney Bentley
By: Olson & Trexler  attys

March 8, 1960 J. S. BENTLEY 2,927,473
ELECTRIC ACTUATORS
Filed July 24, 1958 3 Sheets-Sheet 3

Inventor
James Sydney Bentley
By: Olson & Trexler attys

United States Patent Office 2,927,473
Patented Mar. 8, 1960

2,927,473
ELECTRIC ACTUATORS

James Sydney Bentley, London, England, assignor to Teleflex Incorporated, Wilmington, Del., a company of Delaware Application July 24, 1958, Serial No. 750,703

Claims priority, application Great Britain July 24, 1957

9 Claims. (Cl. 74—424.8)

This invention relates to actuators of the type which include an electric motor adapted to be driven in either direction and which rotates, through reduction gearing, an axially held shaft in axial connection with the member of a screw and nut assembly which is held from axial movement but free to rotate, leaving the other member of said assembly which is axially extended into a "ram," free to move axially but held from rotation, to project or retract said ram from or into a casing carrying the motor, to lengthen or shorten the axial distance between a pivotal connection at one end of the casing and a pivotal connection at the outer end of the ram, in order to exert a push or pull on the part to be actuated, and has for its object to form such actuators with load-sensitive means, or both load and travel sensitive means.

According to the present invention the shaft having the final gear of the reduction gearing thereon and axially extended to form the member of the screw and nut assembly which is held from axial movement, is mounted to rotate in bearings in the casing which also will allow slight axial movement of the shaft, and has mounted between two abutments moving therewith and in fixed axial relation thereto, a preloaded compression spring, which spring is also held between two other abutments in fixed axial relation with the casing.

The arrangement of the parts is such that when the pull or push axially transmitted through the shaft is less than the spring loading, this shaft does not move axially in relation to the casing but when this loading is exceeded, either in pulling or pushing, the shaft moves axially to a slight extent in relation to the casing, in one direction when a pull is being transmitted and in the other direction in the case of a push.

A striking gear is provided in connection with this shaft, which is moved by the axial movement thereof and controls switch means associated with the motor circuit, which is operated according to the direction of axial movement of the shaft, to switch the motor out of circuit, which motor preferably has brake means of any usual kind for almost instantaneous stopping to prevent overrunning. Preferably, two limit switches are employed, one or the other of which is operated according to the direction of the axial movement of the shaft.

The compression spring can take any suitable structural form, for example it can be a single helical spring, or grouped helical springs. It may be a "disc" spring, and in any case preferably it is housed in a capsule arranged coaxially with the shaft, held from axial movement but free to rotate with said shaft.

According to a further feature of the invention the aforesaid switch means are also controlled by a further striking gear associated with and operated by the movement of two adjustably positioned abutments which are subjected to the abutting action of a stop that moves with the ram or a part connected to said ram.

The two adjustably set abutments are carried by a fixed part in the casing and can be set to limit the travel of the ram into and out of the casing. Their extreme settings allow the maximum movement of the ram and all settings between these two extremes give a shorter stroke in any required position between the ambit of this maximum stroke.

The two striking gears are so arranged that either can come into operation without interfering with or being interferred with by the other.

In order that the invention may be better understood, it will now be described with reference to the accompanying somewhat diagrammatic drawings which are given by way of example only and in which:

Fig. 1 is an elevation of one form of actuator constructed according to the invention and of the kind in which the shaft extends into an axially held screw.

Fig. 2 is a side view of Fig. 1 with parts removed and parts seen in section.

Fig. 3 is an end elevation of Fig. 1.

Fig. 5 is a fragmentary cross-sectional end elevation of parts of the travel-limiting striking gear shown in Fig. 2 but to a larger scale, and Fig. 6, an elevation partly in section of another form of actuator constructed according to the invention and in this case of the kind in which the shaft extends into an axially held nut.

Figure 4:
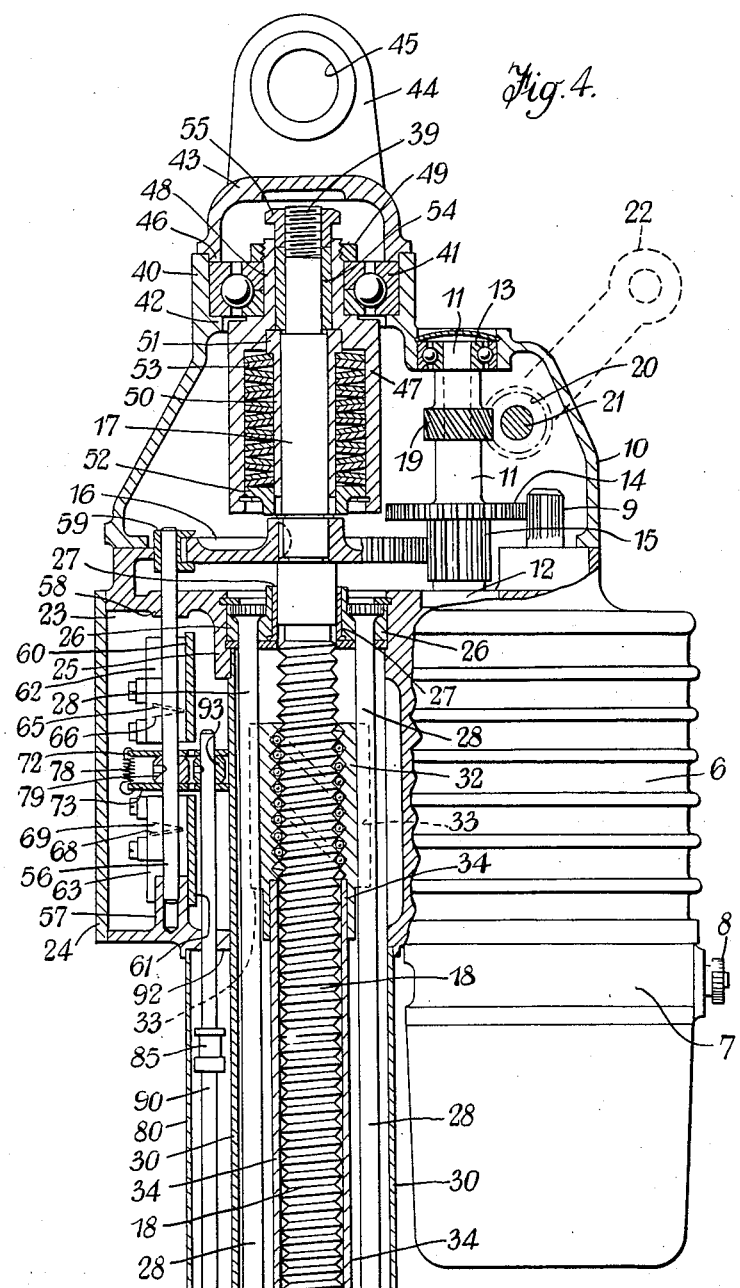
Fig. 4 is an enlarged view of the upper part of Fig. 1, but mainly in section.

The main casing of the actuator comprises a portion 6 having cooling fins, which houses an electric motor adapted to be driven in either direction according to the direction of the supply current and subject to the action of a brake which is instantly applied upon the cessation of the current driving the motor and which is housed in a casing 7.

As this motor and brake in association are of a well-known type, the only detail referred to is the head 8 for manually releasing and re-applying the brake when required. This is provided as otherwise the brake remains "on" until the current again passes to the motor.

The end of the motor shaft 9 is toothed to constitute a driving pinion and this projects into a further portion 10 of the casing, which portion houses the reduction gearing. This latter comprises a shaft 11 mounted to turn freely in bearings 12 and 13 and having secured thereto a large gear-wheel 14 meshing with the toothed shaft end 9, and a smaller toothed pinion 15 which meshes with a large gear-wheel 16 keyed to the shaft 17 which is axially extended and formed with a screw-thread 18.

The shaft 11 also carries a further gear-wheel 19 meshing with a driving gear-wheel 20 on a cross shaft 21 turning in bearings in the casing portion 10. This cross shaft has a shaped bore at one end and is for manual operation by a removable crank handle 22 which fits into said bore. This is possible only when the electric motor is stopped and also when the brake has been manually taken off by the operation of the head 8, and is for the purpose of manually operating the actuator in the case of a breakdown of the motor, or for setting purposes.

The main casing also includes a switch box portion 23 with a cover 24. Between the motor casing 6 and the switch box the main casing has a bored portion 25 to receive a detachable bored end plate 26 which is held in position between annular rings and carries a bearing 27 in which the shaft 17 can rotate; this bearing also allows the shaft to have a small amount of axial movement therein, in either direction from the position shown in Fig. 4.

The plate 26 is recessed to receive the shaped heads of guide rods 28, arranged 180° apart, parallel to and at equal radial distances from the axis of the shaft 17. They pass through this plate and extend to and through the end plate 29 of the ram enclosing casing 30 and are secured in position by nuts on their outer ends one of which, 31, appears in Fig. 2.

These guide rods 28 co-operate with the nut 32 which has longitudinal grooves or guides 33 engaging the rods 28, to hold the nut from rotation but to allow its free axial movements. The thread of the nut engages the thread 18 of the shaft 17. As shown in Fig. 4, the screw and nut device utilised is of the known type which comprises anti-friction balls between the grooves of the threads of the shaft and nut, these balls moving through endless paths during the operation of the parts.

The nut 32 has fixed thereto one end of a tubular ram 34. The other end passes out of the ram enclosing casing 30 through the end plate 29 and, in the usual manner, has full axial support in a gland-like sleeve (not shown) which is within said casing adjacent the end plate 29. The actual outer end of the ram is secured in any usual manner to a shaped backing or base 35 having an integral fork the limbs 36 of which are apertured at 37 for a connecting pin of suitable form. 38 is the usual somewhat flexible expansible and collapsible bellows-like sleeve or gaiter to insulate the projecting portion of the ram from dust or the like.

The end of the screwed portion 18 of the shaft 17 extends far enough to allow the nut 32 to have the maximum travel in order to project the ram 34 to the maximum extent. This is limited by the position at which the end of the nut will make contact with the inner end of the bearing or gland located within the ram enclosing casing 30 adjacent its end plate 29. The other end of the shaft 17 is reduced at 39 for a short length and for a portion of this length is screw-threaded.

The casing portion 10 housing the reduction gearing includes an open-ended hollow cylindrical part 40 coaxial with the shaft 17 to receive a combined ball and thrust bearing 41 against a flange 42. This part 40 is covered-in by an attached cup-like casing member 43 having an integral fork the limbs 44 of which are apertured at 45 for a connecting pin or the like.

An inwardly projecting spigot-like part 46 of the casing member 43 abuts against the ball bearing 41 and holds this in position and there is a desired clearance between the end of the reduced portion 12 of the shaft 17 and the interior surface of the casing member 43.

47 is a hollow cylinder or "capsule" open at one end and having a reduced sleeve portion 48 at the other end, the exterior of which sleeve fits and is mounted in the inner races of the ball and thrust bearing 41. The outer end of the sleeve is screw-threaded on the exterior and the sleeve and capsule are held mounted in the bearing 41 by a securing nut 49 engaging the screwed end of the sleeve and completely free to rotate with the inner races of the bearing.

The portion of the shaft 17 which comes within the capsule 47 has mounted thereon a sleeve 50 one end of which has a flange 51 fitting within an annular recess or step at the junction between the capsule 47 and sleeve 48. The inner step of the flange 51, when the parts are fitted in position, projects slightly into the hollow interior of the capsule 47.

The open end of the capsule 47 has slidably fitted therein an annular pressure plate 52 the bore in which is a sliding fit over the exterior of the sleeve 50. The exterior of the boss of this plate forms an abutment and is located in contact with or almost in contact with the end of the boss of the gear-wheel 16. The annular pressure plate 52 is held in position in the capsule by a removable C spring.

Between the inner surface of the pressure plate 52 and the flange 51 of the sleeve 50 there are located a plurality of spring discs 53 of slightly conical form. As shown in the drawings, these discs are arranged in pairs, each pair having the same angular conicity but adjacent pairs being inclined in reverse directions. The whole arrangement constitutes a compression spring and it will be understood that extremely great pressure must be brought to bear on the spring so comprised to cause its compression. This great pressure on the one hand can be exerted by moving the flange 51 towards the annular pressure plate 52 or, on the other hand, it can be exerted by moving the pressure plate 52 towards the flange 51.

The interior diameter of the sleeve 48 is greater than the interior diameter of the sleeve 50 and the portion 39 of the shaft 17 which is of lesser diameter is located within the sleeve 48. However, between the interior of this sleeve and the exterior of this portion 39 of the shaft, there is fitted on this portion of the shaft a thrust sleeve 54 which can slide in the sleeve 48. On the one hand this sleeve abuts the flanged end 51 of the sleeve 50 and at the other end it is abutted by a hollow cylindrical portion of a nut 55 in screwed relation with the reduced end 39 of the shaft, the cylindrical portion of the nut being able to slide in the sleeve 48.

From the above construction it will be appreciated that if, with the parts in the position shown in Fig. 4, the shaft 17 is pulled slightly downwardly in relation to the casing, then on the one hand the annular pressure plate 52 will not partake of this axial movement but the flange 51 will, as the downward movement is imparted thereto through the nut 55 and thrust sleeve 54. The axial movement of the sleeve 50 with the shaft in relation to the pressure plate 52, is permitted, as although the end of the sleeve 50 always projects into the bore of the pressure plate, it is sufficiently spaced from the end of the boss of the gear-wheel 16 to give all the movement required.

Again, if in place of the shaft moving downwardly from the position shown in Fig. 4, it is moved slightly upwardly, then the flange 51 remains fixed but the end of the boss of the gear-wheel 16 abuts the boss of the pressure plate 52 and by the continued axial movement moves this pressure plate to a slight axial extent over the outer surface of the sleeve 50 and over the inner surface of the capsule 47.

Both of the above-described slight axial movements of the shaft in relation to the casing serve to compress still further the spring in the capsule.

A striking gear is provided in association with the gear-wheel 16. This comprises a sliding rod 56 one end of which is mounted to slide in a bearing 57 coming within the gear box 23. In an intermediate position it also slides in a further bearing 58 in the parallel wall of the gear box, to leave a projecting end on which is secured a fork member 59 the limbs of which come one on each side of the gear-wheel 16 near its periphery, in such manner that the gear-wheel is always free to rotate but any axial movement imparted to the gear-wheel is followed by the fork.

The switch box 23 is bridged on the interior by two similar supporting spaced apart plates 60 and 61, each supporting a similar limit switch 62 and 63 respectively. These switches may be of any known type which normally remains in the On position until restrained to move to the Off position by a snap action, and immediately the restraint is removed returns by a snap action to the On position. The connecting leads to the motor for running in one direction include one of said switches and the leads for the other direction, the other said switch. Thus, when the motor is operated from its main switch, to run in one direction, as the limit switch for the particular direction is in the On position this limit switch does not affect the normal operation; should, however, the limit switch be moved to the Off position, the motor would stop immediately.

The switch 62 includes a snap action rocking contact 64 shown in Fig. 2, and indicated in Fig. 4 by double dotted lines 65 in the On position and a single dotted line 66 in the Off position.

Similarly, the switch 63 includes a snap action rocking contact 67 shown in Fig. 2, and indicated in Fig. 4 by double dotted lines 68 in the On position and a single dotted line 69 in the Off position.

The switch 62 also includes a headed plunger 70 kept pressed outwardly by a spring and in this outward position holding the contact 64 in the On position. When the plunger is pressed in, even slightly, the contact 64 snaps into the Off position and when the plunger is caused by its spring to move to its outward position again, it causes the contact immediately to snap back to the On position.

A similar action takes place with respect to a plunger 71 included in the switch 63 and which controls the position of the contact 67.

It should be observed that although the switches 62 and 63 are similar, they are arranged in reverse positions with the axes of the two plungers in alignment and so that the head of one plunger comes a small defined space from the head of the other plunger, and that the outer faces of the heads of these plungers are somewhat spherically rounded.

In the space between the two supporting plates 60 and 61 two somewhat similar plates 72 and 73 extend transversely across the switch box and their lower ends are independently pivoted to turn on the axially aligned stub spindles 74 and 75, which spindles project from the interior surface of the parallel walls of the switch box in positions where they make junction with the ram enclosing casing 30.

The plate 72 has a bent out tongue portion 76 which comes in the space between the heads of the two plungers and in contact with the head of the plunger 70. Similarly, the plate 73 has a bent out tongue portion 77, also coming in this space but in contact with the head of the plunger 71. The two tongues 76 and 77 also contact between themselves but are completely free the one from the other.

The upper edges of the plates 72 and 73 are connected by a tension spring 78 shown in Fig. 4 but omitted from Fig. 2 for the sake of a clearness.

The striker rod 56 has secured thereto a collar 79 and this is located between the two plates 72 and 73. As a result, when this rod is moved upwardly from the position shown in Fig. 4 by the upward movement of the gear-wheel 16, then the collar 79 causes the plate 72 to push in the plunger 70 which immediately brings the contact 64 to the Off position shown at 66 in Fig. 4. This cuts out the motor instantly and stops the drive on the gear-wheel 16 and consequently the action of the actuator. The plate 73, owing to the connection of the spring 78, follows the movement of the plate 72 and is actually drawn away from the plunger 71.

Again, when the rod 56 is moved downwardly from the position shown in Fig. 4 by the downward movement of the gear-wheel 16, then the collar 79 causes the plate 73 to push in the plunger 71 which immediately brings the contact 67 to the Off position shown at 69 in Fig. 4. This cuts out the motor instantly and stops the drive of the gear-wheel 16 and consequently the action of the actuator. The plate 72, owing to the connection of the spring 78, follows the movement of the plate 73 and is actually drawn away from the plunger 70.

The operation of the actuator according to the invention thus far described will be readily understood from the above. That is to say, when acting to pull or push, normally the gear-wheel 16 is held in the position shown in Fig. 4, the springs in the capsule 47 having been set to a predetermined maximum normal loading.

However, should this maximum loading be exceeded for any reason, either when acting to pull or push, then the shaft 17 moves axially in relation to the casing and this movement is followed by the gear-wheel 16 which operates the striking gear to bring about the results already set forth.

Actuators in accordance with the present invention in some cases need only include load-sensitive means as already described, but in preferred cases, and as shown in the drawings, they also include travel-sensitive means operating upon the same two limit switches.

For this purpose, in the particular embodiment shown in Figs. 1 to 5, in a space between the outer surface of the ram enclosing casing 30 and a sprung-on cover portion 80 (Fig. 5) there is mounted between the exterior of an end plate of the switch box and the end plate 29 of the ram enclosing casing, a fixed guide rod 81. This has mounted to slide thereon two blocks 82 one of which appears in Fig. 5, each block being adapted to be secured in any position on the rod by a clamping screw 83 the shank of which also constitutes a pivot for a two-armed lever. The upper lever shown in Fig. 2 has two arms 84 and 85, both with rounded ends, and the lower lever shown in Fig. 2 has two arms 86 and 87, also with rounded ends. The arms 84 and 86 constitute abutments or stops, whilst the arms 85 and 87 engage in grooves on adjustably positioned sleeves 88 and 89 respectively which are fixed to a striking rod 90 adapted to slide at one end in a bearing 91 in the end plate 29 of the ram enclosing casing and in an intermediate position towards the other end in a bearing 92 (Fig. 4) in an end wall of the switch box. This striking rod 90 extends into the switch box, passes through apertures in the plates 72 and 73, and the portion coming between these two plates has secured thereon a collar 93.

There is also provided a sliding rod 94 which passes through a bearing in the end plate 29 of the ram enclosing casing and one end of which is attached to the backing or base 35 to which the outer end of the ram 34 is secured.

The other end, which comes within the space between the casing 30 and the cover 80, has secured thereto a sleeve 95 the ends 96 and 97 of which constitute abutments. This sleeve has an integral apertured guide 98 which co-operates with the fixed guide rod 81.

The operation is as follows: The two fixed blocks 82 can be set in any position on the fixed rod 81. In Fig. 2 they are shown at their extreme positions and it will be understood that also the sleeves 88 and 89 respectively are adjustably set on the striking rod 90 in these adjusted positions. As a consequence, just prior to the ram being completely withdrawn into its casing, the abutment 96 contacts the arm 84 and this will cause the arm 85 to move the rod 90 downwardly from the position shown in Fig. 2. This will cause the sleeve 93 to move the plate 73 downwardly from the position shown in Fig. 2, which movement is imparted to the plunger 71 which immediately brings the contact 67 of the Off position indicated by the dotted line 69 (Fig. 4); this has the result already set forth fully herein.

However, it must here be emphasized that this movement of the striking rod 81 and plate 73 in no way affects the striking rod 56 as in this case the plate 72 does not have the movement of the plate 73, but when the plate 73 is moved the spring 78 is stretched to accommodate this movement.

When the ram 34 in the operation of the actuator is almost fully projected, then the abutment 97 will contact the stop 86 and, the movement continuing, move the striker rod 90 so that the collar 93 causes the plate 72 to operate the plunger 70 to bring the contact 64 to the Off position indicated by 66 in Fig. 4. The movement of the plate 72 is not imparted to the plate 79 as the spring 78 takes up this movement. Consequently, the striker rod 56 is not interfered with.

It should be further explained that when the sleeve 95 is in any intermediate position between the arms 84 and the arms 86, should the striker rod 56 of the load-sensitive striker gear be moved to move one or other of the plates 72 and 73, this in no way affects the striker rod 90 as in these circumstances the stretch of the spring 78 accommodates the action.

It will be appreciated that the two-armed levers can be set into any positions between their extremes on the rod 81 and the corresponding positions of the sleeves 88 and 89 on the striker rod 90, according to the length of the stroke of the actuator and the position of said stroke in the ambit between the two extremes. For example, Fig. 2 shows in dotted lines a position into which the lower block can be adjusted on the rod 81 to bring the arms 86 and 87 in another position between the limits of operation.

The various cables and connections to the actuator shown in the drawings, from the control point, can be formed as indicated in Fig. 1 as a multiple cable 99 connected to the interior wiring of the device by a multiple plug and socket connection 100.

Figure 6:
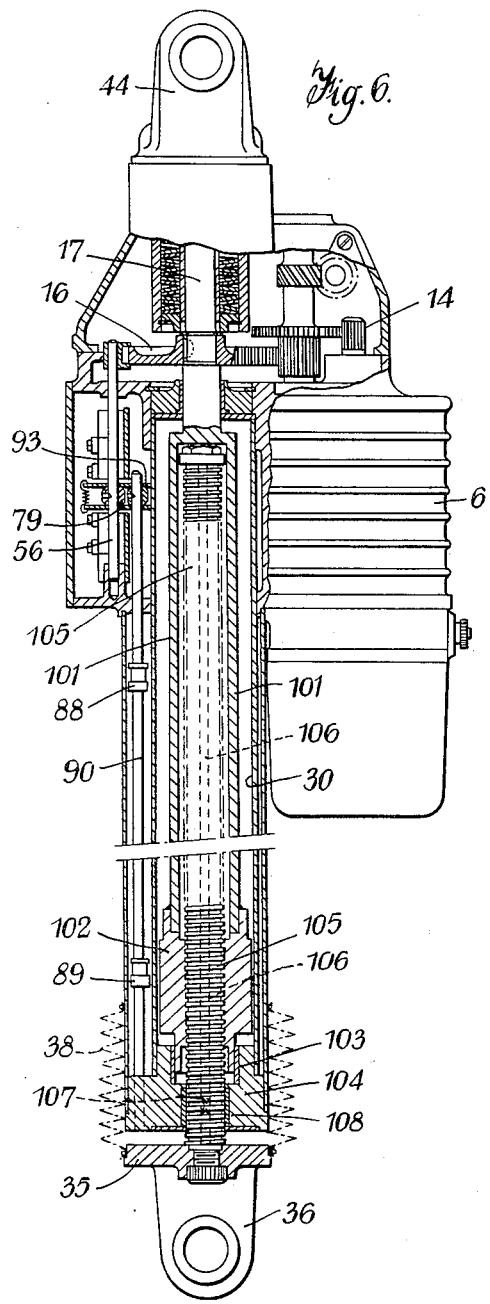

In the embodiment shown in Fig. 6, the structure to a large extent is the same as that shown in Figs. 1 to 5. However, in this case the shaft 17 is extended into a long hollow shaft 101 which carries in an axially fixed manner the nut member 102 at its outer end, which end is mounted in a bearing 103 carried by the end plate 104 of the ram-enclosing casing 30. This bearing 103 is such that it allows the hollow shaft 101 to have slight axial movement in either direction should the shaft 17, in the manner already set forth, be caused to have axial movement in relation to the casing.

The ram in this instance is formed by the screw 105 one end of which is attached to the backing or base 35 having the apertured forked limbs 36 for the connecting pin. This screw 105 engages with the thread of the nut 102 and its other end, in the fully collapsed state of the actuator, comes as shown just spaced from the junction between the shaft 17 and its hollow extension 101. The screw 105 is held from rotation by the keyway or groove 106 cut in its surface, which engages with and in its axial movement slides over a key 107 secured to the bush 108 attached to the end plate 104; both the keyway 106 and key 107 are shown dotted in Fig. 6.

As will be readily appreciated, the actuator shown in Fig. 6 operates in precisely the same manner as that already particularly described, with the single exception that the screw 105 moves axially and is held from rotation, whilst the nut 102 rotates and is held from axial movement.

Although in Fig. 6 the engaging threaded parts between the nut 102 and screw 105 are of an ordinary nature, it will be realised that in this construction the screw and nut device can also be of the type which comprises anti-friction balls between the grooves of the threads of the screw and nut, the balls moving through endless paths during the operation of the parts.

The invention is not limited to the precise forms or details of construction herein described, as these may be varied to suit particular requirements.

The invention is claimed as follows:

1. An actuator of the type described comprising a rotatable driving member operable in opposite directions for advancing and retracting a driven member, a shaft fixed to and supporting said driving member, casing means, bearing means fixed in said casing means and supporting said shaft for rotative and slight axial movement relative to the casing means, compression spring means mounted along said shaft and normally retained against axial movement relative to said casing means, means connected with said shaft and including an electric motor for rotating said shaft, a pair of abutment means axially spaced and retained on said shaft and respectively disposed adjacent opposite ends of said spring means for compressing the spring means upon axial movement of the shaft in opposite directions relative to the casing means whenever reaction thrust applied to the shaft from the driving member exceeds a predetermined value, means including switch means adjacent said shaft and electrically connected with said motor for stopping the motor, and means shiftably supported on said casing means and responsive to axial shifting movement of the shaft relative to the casing means for actuating said switch means to stop said motor.

2. An actuator, as defined in claim 1, wherein said electric motor is selectively operable in opposite directions, and said switch means includes two limit switches selectively operable by said actuating means according to the direction of axial movement of the shaft.

3. An actuator, as defined in claim 1, wherein said compression spring means encircles and is adapted to rotate with said shaft.

4. An actuator, as defined in claim 3, wherein said compression spring means comprises a plurality of disc springs.

5. An actuator, as defined in claim 3, which includes a capsule enclosing and supporting said spring means and mounted for rotative movement and fixed from axial movement in said bearing means.

6. An actuator, as defined in claim 5, which includes a pressure plate retained in and shiftably disposed in one end of said capsule and engaging one end of said compression spring means, one of said abutment means on the shaft being engageable with said pressure plate for shifting the pressure plate to compress the spring means when the shaft moves axially in one direction, the other of said abutment means being engageable with an opposite end of said compression spring means for compressing said spring means against said pressure plate upon axial movement of the shaft in an opposite direction.

7. An actuator, as defined in claim 1, wherein said means for actuating said switch means comprises a radially extending annular member fixed on said shaft, a fork element embracing the periphery of said radially extending member and movable axially therewith, and means operatively connecting said fork element and said switch means.

8. An actuator, as defined in claim 1, which includes additional means for actuating said switch means to stop said motor in response to the accomplishment of a predetermined amount of axial movement of the driven member.

9. An actuator, as defined in claim 8, wherein said additional means for actuating the switch means comprises an abutment movable with said driven member, a shiftable element adjustably mounted for engagement by said last mentioned abutment at the completion of a predetermined amount of movement of said driven member, and means operatively interconnecting said shiftable element and said switch means and operable by said shiftable element for operating the switch means.

References Cited in the file of this patent

UNITED STATES PATENTS

| | | |
|---|---|---|
| 2,422,495 | Morrow | June 17, 1947 |
| 2,738,685 | Hartz et al. | Mar. 20, 1956 |
| 2,806,383 | Geyer | Sept. 17, 1957 |
| 2,809,736 | Hoover | Oct. 15, 1957 |